United States Patent [19]
Totten et al.

[11] Patent Number: 5,458,195
[45] Date of Patent: Oct. 17, 1995

[54] CEMENTITIOUS COMPOSITIONS AND METHODS

[75] Inventors: Patty L. Totten; Bobby J. King; Jiten Chatterji, all of Duncan, Okla.

[73] Assignee: Halliburton Company, Duncan, Okla.

[21] Appl. No.: 314,557

[22] Filed: Sep. 28, 1994

[51] Int. Cl.$^6$ .................................................. E21B 33/138
[52] U.S. Cl. .......................... 166/293; 166/295; 106/724; 523/130
[58] Field of Search ..................................... 166/293, 295; 106/696, 708, 724, 778, 790; 405/263, 266; 523/130

[56] References Cited

U.S. PATENT DOCUMENTS

| | | | |
|---|---|---|---|
| 2,492,212 | 12/1949 | Dailey | 166/293 |
| 3,016,092 | 1/1962 | Harvey et al. | 166/293 |
| 3,557,876 | 1/1971 | Tragesser | 166/292 |
| 3,591,542 | 7/1971 | Bonnel et al. | 166/293 X |
| 4,818,288 | 4/1989 | Aignesberger et al. | 106/790 |
| 5,058,679 | 10/1991 | Hale et al. | 166/293 |
| 5,107,928 | 4/1992 | Hilterhaus | 166/293 |
| 5,293,938 | 3/1994 | Onan et al. | 166/293 |
| 5,295,543 | 3/1994 | Terry et al. | 166/293 |
| 5,327,968 | 7/1994 | Onan et al. | 166/293 |
| 5,346,012 | 9/1994 | Heathman et al. | 166/292 X |
| 5,355,954 | 10/1994 | Onan et al. | 166/293 X |
| 5,383,521 | 1/1995 | Onan et al. | 166/293 |

FOREIGN PATENT DOCUMENTS 91306469.7 7/1991 European Pat. Off. .

OTHER PUBLICATIONS

SPE Paper No. 20452 entitled *"Conversion of Mud to Cement"* by W. N. Wilson, R. B. Carpenter and R. D. Bradshaw, Arco Oil & Gas Co., presented at the 65th Annual Technical Conference and Exhibition of the Society of Petroleum Engineers held in New Orleans, La., Sep. 23–26, 1990.

SPE Paper No. 24575 entitled *"Conversion of Drilling Fluids to Cements With Blast Furnace Slag: Performance Properties and Applications for Well Cementing"* by K. M. Cowan, A. H. Hale and J. J. Nahm, Shell Development Co., presented at the 67th Annual Technical Conference and Exhibition of the Society of Petroleum Engineers held in Washington, D.C. Oct. 4–7, 1992.

*Primary Examiner*—George A. Suchfield
*Attorney, Agent, or Firm*—Robert A. Kent; C. Clark Dougherty, Jr.

[57] ABSTRACT

The present invention provides improved cementitious compositions which can include drilling fluid as a component thereof and methods of cementing wells utilizing such compositions. The compositions are basically comprised of a cementitious material, water, a hardenable resinous material and optionally, drilling fluid in an amount up to about 70% by volume of the cementitious material in the composition.

5 Claims, No Drawings

CEMENTITIOUS COMPOSITIONS AND METHODS

BACKGROUND OF THE INVENTION

1. Field of the Invention

The present invention relates generally to cementitious compositions and methods of using such compositions, and more particularly, to cementitious compositions containing drilling fluid and methods of using such compositions in performing well cementing operations.

2. Description of the Prior Art

A variety of drilling fluids are used in drilling wells such as oil, gas and water wells. The most commonly used drilling fluids are solids-containing water base gels which can be weighted with particulate weighting materials such as barite. After a well bore is drilled during which the drilling fluid used is circulated through the well bore, the circulation of the drilling fluid is stopped while the well is logged and a string of pipe, e.g., casing, is run in the well bore. After the pipe is run, the drilling fluid in the well bore is conditioned by circulating drilling fluid downwardly through the interior of the pipe and upwardly through the annulus between the exterior of the pipe and the walls of the well bore while removing drilling solids and gas therefrom.

The next operation performed on the well is usually primary cementing, i.e., the string of pipe disposed in the well bore is cemented therein by placing a cementing composition in the annulus between the pipe and the walls of the well bore. The cementing composition is permitted to set into a hard substantially impermeable mass in the annulus whereby the pipe is bonded to the walls of the well bore and the annulus is sealed. When the cementing composition is run down the pipe and into the annulus, the drilling fluid in the pipe and annulus is displaced therefrom. The used drilling fluid is generally accumulated in a pit or tank and then disposed of.

The disposal of drilling fluid is time consuming and expensive, particularly in offshore drilling locations, in that drilling fluid often must be disposed of as a fluid which is hazardous to the environment. Thus, any environmentally safe use to which all or part of the drilling fluid can be put at a well site is highly advantageous since it eliminates the need for disposing of all or part of the drilling fluid.

By the present invention, improved cementitious compositions and methods of using such compositions in well cementing operations are provided. A portion of the drilling fluid used to drill a well can be utilized as a component in the cementitious composition used for cementing the well. The portion of the drilling fluid which is not utilized in the cementing composition can be disposed of conventionally, or it can be incorporated into a cementitious composition of this invention, placed into an environmentally safe location and allowed to set into a hard environmentally safe cementitious mass therein.

SUMMARY OF THE INVENTION

The present invention provides improved cementitious compositions and methods of using the compositions for performing well cementing operations. The cementitious compositions are basically comprised of a cementitious material, water and a hardenable resinous material. The compositions can optionally also include drilling fluid. Upon setting, the compositions form hard cementitious masses having compressive strength.

The cementitious materials which can be utilized in accordance with the present invention include Portland cement, high alumina cement, slag, fly ash, gypsum cement and other similar materials. A variety of single component and multicomponent hardenable resinous materials can be utilized including acrylic, epoxy and phenolic resinous materials. The hardenable resinous material is generally included in the composition in an amount in the range of from about 1% to about 50% by weight of the cementitious material therein.

The methods of this invention basically comprise the steps of forming a cementitious composition of the invention, placing the cementitious composition in a desired location and permitting the composition to set into a hard environmentally safe cementitious mass therein.

It is, therefore, a general object of the present invention to provide improved cementitious compositions and methods of using such compositions.

Other and further objects, features and advantages of the present invention will be readily apparent to those skilled in the art upon a reading of the description of preferred embodiments which follows.

DESCRIPTION OF PREFERRED EMBODIMENTS

Well bores are most commonly drilled using a rotary bit connected to a string of drill pipe. The drill pipe and bit are rotated and a drilling fluid, most often a water base gel with or without weighting materials suspended therein, is circulated downwardly through the drill pipe, through ports in the drill bit and upwardly through the annulus between the drill pipe and the walls of the well bore to the surface. An example of a water base gel is an aqueous solution of a clay such as bentonite containing particulate weighting material such as barite. The drilling fluid carries cuttings produced by the drill bit to the surface which are separated from the drilling fluid as is any gas therein. A reservoir of circulating drilling fluid is maintained on the surface, and the drilling fluid is pumped from the reservoir by circulating pumps back into the drill string. When the well bore has reached total depth, the drilling and the circulation of drilling fluid are stopped, the drill pipe and bit are removed from the well bore, subterranean formations penetrated by the well bore are usually logged and pipe to be cemented in the well bore is run therein.

After the pipe has been run in the well bore, a primary cementing operation is carried out whereby the drilling fluid in the well bore is displaced out of the well bore by a cement slurry and one or more liquid spacers which are typically pumped downwardly through the pipe and then upwardly into the annulus between the pipe and the walls of the well bore. The cement slurry hardens into a substantially impermeable solid mass in the annulus which bonds the pipe to the walls of the well bore and seals the annulus whereby formation fluids are prevented from flowing into the annulus, between subterranean zones penetrated by the well bore and/or to the surface. As previously mentioned, the drilling fluid which is displaced from the well bore during primary cementing must often be disposed of as a hazardous fluid under environmental protection laws. Such disposal is time consuming and expensive, particularly at offshore drilling locations where the used drilling fluid must be displaced into a tanker, transported to shore, unloaded and disposed of on shore in an environmentally safe manner.

The present invention provides improved cementitious compositions which can optionally include drilling fluid as a component thereof. That is, a cementitious composition of this invention including a portion of the drilling fluid used to drill a well bore can be used to carry out cementing operations in the well bore, e.g., primary cementing, cementing lost circulation zones in the well bore and the like. The compositions of this invention including drilling fluid are particularly suitable for primary cementing since they eliminate incompatibility between the cementing composition and drilling fluid remaining in the well bore. Drilling fluid remaining in the well bore becomes a part of the cementitious composition which results in better bonding of the cementitious composition to the walls of the well bore. Also, as mentioned above, the use of a portion of the drilling fluid in the cementitious composition used for primary cementing reduces the volume of drilling fluid which must be disposed of.

The improved cementitious compositions of this invention basically comprise a cementitious material such as the hydraulic cements heretofore utilized in well cementing operations, water, a hardenable resinous material and, optionally, drilling fluid. When drilling fluid is included, the presence of the hardenable resinous material helps consolidate the drilling fluid and it provides additional compressive strength to the set composition.

A variety of cementitious materials can be utilized in accordance with this invention. Examples of such materials are Portland cement, high alumina cement, slag, fly ash of the ASTM Class F type with lime, fly ash of the ASTM Class C type, condensed silica fume with lime, gypsum cement (calcium sulfate hemihydrate) and mixtures of such cementitious materials. Preferred cementitious materials are those of one or more of the above types which are of a fine particle size whereby the particles have diameters no greater than about 30 microns and have a Blaine Fineness no less than about 6000 square centimeters per gram.

Fine particle size Portland cement is disclosed in U.S. Pat. No. 4,160,674 issued on Jul. 10, 1979 to Sawyer. Methods of utilizing such fine particle size Portland cement and other cementitious materials such as slag and mixtures of slag and Portland cement in well cementing are described in U.S. Pat. No. 5,086,850 entitled "Squeeze Cementing" issued on Jun. 16, 1992 and U.S. Pat. No. 5,125,455 entitled "Primary Cementing" issued on Jun. 30, 1992.

Fine particle size cementitious materials used in accordance with this invention are preferably made up of particles having diameters no larger than about 30 microns, more preferably no larger than about 17 microns and still more preferably no larger than about 11 microns. The distribution of various sized particles within the cementitious materials is preferably such that 90% of the particles have a diameter no greater than about 25 microns, more preferably about 10 microns and still more preferably about 7 microns, 50% of the particles have a diameter no greater than about 10 microns, more preferably about 6 microns and still more preferably about 4 microns, and 20% of the particles have a diameter no greater than about 5 microns, more preferably about 3 microns and still more preferably about 2 microns. The Blaine Fineness of the particles is preferably no less than about 6000 square centimeters per gram. More preferably, the Blaine Fineness is no less than about 7000, still more preferably about 10,000 and most preferably no less than about 13,000 square centimeters per gram. When a fine particle size cementitious material is used, the cementitious compositions including the material quickly develops gel strength after placement. Further, because of the fine particle size, the composition enters very small openings in the walls of a well bore and readily bonds thereto.

Of the various cementitious materials mentioned above, the most preferred are gypsum cement, fine particle size Portland cement, fine particle size ASTM Class C fly ash and mixtures of two or more of such cementitious materials. The most preferred cementitious material for use in accordance with this invention is a mixture of gypsum and fine particle size Portland cement.

A variety of single component and multicomponent hardenable resinous materials can also be included in the cementitious compositions of this invention. Examples of suitable single component resinous materials which harden as a result of being heated when placed in a well bore or other warm location are vernonia oil and epoxidized linseed oil or soy oil. Suitable multicomponent hardenable resinous materials which contain hardening agents include acrylic resinous materials, epoxy resinous materials and phenolic resinous materials. Such single or multicomponent hardenable resinous materials are included in the cementitous compositions of this invention in amounts in the range of from about 1% to about 50% by weight of the cementitious material or materials therein.

As mentioned, various hardening agents are included in the multicomponent resinous materials to react with, catalyze or otherwise cause the resinous components therein to harden in a desired time period after cementitious compositions containing the resinous materials are prepared. Examples of acrylic, epoxy and phenolic multicomponent resinous materials are set forth in Table I below.

TABLE I

| Multicomponent Hardenable Resinous Materials | | |
|---|---|---|
| Resin Component | Hardening Agent Component | Concentration Of Hardening Agent And Other Components, Parts By Weight |
| phenol-formaldehyde | $NH_4Cl$ | 100 parts resin:2–5 parts hardening agent |
| diglycidyl ether of Bisphenol-A | methylinedianiline | 100 parts resin:28 parts hardening agent |
| polyethyleneglycol[1] dimethacrylate plus trimethylpropane trimethacrylate plus hydroxymethacrylate | cumene hydroperoxide and cobalt napthenate | 100 parts resin:1–5 parts hardening agent |

[1]Resin components can be used individually or in mixtures of two or more.

The water used in the cementitious compositions of this invention can be any water that does not adversely react with the components of the cementitious compositions, but the water is preferably fresh water. The water used is included in the cementitious compositions in an amount in the range of from about 20% to about 175% by weight of the cementitious material or materials therein.

The drilling fluid component of the cementitious compositions of this invention, when used, can be any aqueous drilling fluid that doesn't contain compounds which adversely react with the other components of the cementing composition. Most commonly used water base gels do not adversely react with such components. The drilling fluid can be included in the cementitious compositions of this invention in amounts up to about 70% by volume of cementitous material therein.

In order to facilitate the dispersal of the cementitious material, resinous material and other solids in the water utilized and maintain such solids in suspension therein, particularly when the solids are of fine particle size, a dispersing agent is preferably included in the cementitious compositions. A variety of known dispersing agents can be used, examples of which are the condensation polymer product of an aliphatic ketone, an aliphatic aldehyde and a compound which introduces acid groups into the condensation polymer described in U.S. Pat. No. 4,818,288 issued Aug. 4, 1989 to Aignesberger et al.; a blend of polyvinylpyrrolidone and the condensate of sodium naphthalene sulfonate with formaldehyde described in U.S. Pat. No. 3,359,225 issued Dec. 19, 1967 to Weisend; a blend of a lignosulfonate salt with polyvinylpyrrolidone and the condensate of sodium naphthalene sulfonate with formaldehyde; a low molecular weight polyacrylic acid; a mixture of sulfite liquor and n-methyl, n-oleyl taurine and naphthalene sulfonic acid.

A particularly suitable dispersing agent is the condensation polymer product of an aliphatic ketone, an aliphatic aldehyde and a compound which introduces acid groups into the condensation polymer disclosed in U.S. Pat. No. 4,818,288. The most preferred such dispersing agent is the condensation polymer product of acetone, formaldehyde and sodium sulfite.

The particular dispersing agent utilized is generally included in the cementitious compositions of this invention in an amount in the range up to about 10% by weight of the cementitious material in the composition.

The components of the cementitious compositions of this invention can be mixed in any convenient order utilizing conventional mixing apparatus. Generally, it is most convenient to combine a dispersing agent if used with the water followed by the mixing of the solid components therewith. The drilling fluid component is preferably mixed with the other components of the composition last.

Another additive which can be utilized in the cementitious compositions of this invention is a set delaying additive for increasing the time in which the composition sets. Set delaying additives are often required to be used in well cementing operations in order to allow enough pumping time for the cementitious composition to be placed in the subterranean zone to be cemented.

A variety of set delaying additives can be utilized such as lignosulfonate salts, e.g., calcium lignosulfonate, sodium lignosulfonate and the like; the copolymer of 2-acrylamido-2-methyl propane sulfonic acid and acrylic acid described in U.S. Pat. No. 5,049,288 issued Sep. 17, 1991 to Brothers et al.; tartaric acid, citric acid, sodium citrate, aminotri(methylene phosphonic) acid and mixtures of such set delaying additives.

Preferably, the set delaying additive is a citric acid salt such as sodium citrate present in the cementitious composition in an amount up to about 10% by weight of the composition.

A preferred cementitious composition of this invention is comprised of the following components:

(a) a cementitious material selected from the group consisting of Portland cement, high alumina cement, gypsum cement and mixtures of such cementitious materials;

(b) water present in the composition in an amount in the range of from about 20% to about 175% by weight of the cementitious material or materials therein; and (c) a hardenable resinous material selected from the group consisting of acrylic resinous materials, epoxy resinous materials, phenolic resinous materials and mixtures of such resinous materials present in the composition in an amount in the range of from about 1% to about 50% by weight of the cementitious material or materials therein.

Another preferred cementitious composition of this invention is comprised of:

(a) a cementitious material selected from the group consisting of Portland cement, high alumina cement, gypsum cement and mixtures of such cementitious materials;

(b) water present in the composition in an amount in the range of from about 20% to about 175% by weight of the cementitious material or materials therein; and (c) a hardenable resinous material selected from the group consisting of acrylic resinous materials, epoxy resinous materials, phenolic resinous materials and mixtures of such resinous materials present in the composition in an amount in the range of from about 1% to about 50% by weight of the cementitious material or materials therein; and (d) drilling fluid present in the composition in an amount up to about 70% by volume of the cementitious material or materials therein.

As indicated above, the cementitious composition can optionally include a dispersing agent. When included, the dispersing agent is preferably selected from the group consisting of the condensation polymer product of acetone, formaldehyde and sodium sulfite, a blend of polyvinylpyrrolidone and the condensate of sodium naphthalene sulfonate with formaldehyde, a blend of a lignosulfonate salt with polyvinylpyrrolidone and the condensate of sodium naphthalene sulfonate with formaldehyde, a low molecular weight polyacrylic acid, a mixture of sulfite liquor and n-methyl, n-oleyl taurine and naphthalene sulfonic acid. When used, the dispersing agent is preferably included in the cementitious composition in an amount up to about 10% by weight of the cementitious material in the composition.

The cementitious compositions can also optionally include a set delaying additive. When included, the set delaying additive is preferably selected from the group consisting of metal lignosulfonate salts, tartaric acid, citric acid, sodium citrate, the copolymer of 2-acrylamido-2-methyl propane sulfonic acid and acrylic acid, aminotri(methylene phosphonic) acid and mixtures of such set delaying additives. The set delaying additive, when used, is preferably included in the cementitious composition in an amount up to about 10% by weight of the cementitious material in the composition.

A particularly preferred cementitious composition of this invention is comprised of a mixture of gypsum and a fine particle size cementitious material selected from the group consisting of Portland cement or ASTM Class C fly ash, the particles of the cementitious material having diameters no greater than about 30 microns and having a Blaine Fineness no less than about 6000 square centimeters per gram; a hardenable resinous material comprised of a phenolic resinous material present in the composition in an amount in the range of from about 5% to about 20% by weight of the cementitious material; a dispersing agent comprised of the condensation polymer product of acetone, formaldehyde and sodium sulfite present in the composition in an amount in the range of from about 0.5% to about 3.5% by weight of the cementitious material, sodium citrate present in the composition in an amount in the range of from about 0.2% to about 1.5% by weight of the cementitious material and drilling fluid present in the composition in an amount in the range of from about 5% to about 30% by volume of the cementitious material therein. When a cementitious composition containing a portion of the drilling fluid used to drill the well as a component thereof is formed, the dry components of the cementitious composition and water, if required, can be added directly to the drilling fluid or the components of the cementitious composition less the drilling fluid can be premixed and then combined with the drilling fluid.

In order to further illustrate the cementitious compositions and methods of this invention, the following examples are given.

curing, the compressive strengths of the compositions were determined in accordance with the standard testing procedure set forth in *API Specification for Materials and Testing for Well Cements*, API Specification 10A, 21st Edition dated Sep. 1, 1991, of the American Petroleum Institute, Washington, D.C.

The results of these tests are set forth in Table II below.

TABLE II

| Class C Flyash, % by weight[1] | Fine Particle Size Portland Cement, % by weight[1] | Gypsum Cement, % by weight[1] | Phenolic Resinous Material, % by weight[1] | Water, % by weight[1] | Drilling Fluid, % by volume[2] | Curing Temp, °F. | Curing Time, hrs | Compressive Strength, psi |
|---|---|---|---|---|---|---|---|---|
| 0.0 | 36.4 | 19.1 | 8.1 | 36.4 | 0 | 120 | 24 | 151 |
| 0.0 | 33.3 | 23.4 | 10.0 | 33.3 | 0 | 80 | 24 | 365 |
| 0.0 | 25.0 | 35.0 | 15.0 | 25.0 | 0 | 80 | 24 | 619 |
| 12.5 | 12.5 | 35 | 15 | 25 | 0 | 80 | 24 | 659 |
| 12.5 | 12.5 | 35 | 15 | 25 | 50 | 80 | 24 | 27 |
| 0.0 | 26.9 | 37.8 | 16.2 | 19.1 | 0 | 80 | 24 | 679 |
| 22.6 | 22.6 | 15.8 | 6.8 | 32.2 | 0 | 80 | 24 | 254 |
| 0.0 | 44.4 | 7.8 | 3.4 | 44.4 | 50 | 120 | 72 | 322 |
| 0.0 | 47.6 | 3.3 | 1.5 | 47.6 | 50 | 120 | 72 | 158 |

[1]% by weight of the cementitious composition
[2]% by volume of the cementitious composition

EXAMPLE 1

Test cementitious compositions of this invention were prepared utilizing various quantities of Class C fly ash, fine particle size Portland cement, gypsum, a phenolic resinous material and water with and without drilling fluid. The phenolic resinous material was comprised of a mixture of phenol-formaldehyde resin and ammonium chloride hardening agent. The drilling fluid used was an aqueous drilling fluid containing various gelling agents and other components as follows.

| Drilling Fluid Component | Quantity, Gallons or Pounds Per Barrel of Drilling Fluid |
|---|---|
| Water | 42 gallons per barrel |
| Sodium Carbonate | 0.037 lbs per barrel |
| Sodium Sulfite | 0.088 lbs per barrel |
| Bentonite | 8 lbs per barrel |
| Xanthan Gum | 0.25 lbs per barrel |
| Potassium Hydroxide | 0.25 lbs per barrel |
| Low Viscosity Polyanionic Cellulose | 1.5 lbs per barrel |
| Partially Hydrolyzed Polyacrylamide | 1 lb per barrel |
| Potassium Chloride | 32 lbs per barrel |

The various cementitious compositions formed were cured at 80° F. or 120° F. for 24 hours or 72 hours. After From the test results set forth in Table II above, it can be seen that the cementitious compositions of this invention with and without drilling fluid as a component thereof attain good compressive strengths at typical temperatures and in reasonable times.

EXAMPLE 2

Additional cementitious compositions of this invention were prepared comprised of gypsum cement, the phenolic resinous material described in Example 1 above and water with and without drilling fluid. The drilling fluid utilized was an aqueous drilling fluid containing the following components:

| Drilling Fluid Component | Quantity, Gallons or Pounds Per Barrel of Drilling Fluid |
|---|---|
| Water | 40 gallons per barrel |
| Bentonite | 17.5 lbs per barrel |
| Sodium Polyacrylate | 1.25 lbs per barrel |
| Simulated Formation Cuttings | 30 lbs per barrel |
| Sodium Hydroxide | 0.25 lbs per barrel |

The cement compositions formed were allowed to cure at 80° F. for curing times of 24 hours and the compressive strengths of the cured cementitious compositions were determined in accordance with the test procedures set forth in Example 1 above. The results of these tests are set forth in Table III below.

TABLE III

| Gypsum Cement, % by weight[1] | Phenolic Resinous Material, % by weight[1] | Water, % by weight[1] | Drilling Fluid, % by volume[2] | Curing Temp °F. | Curing Time hrs | Compressive Strength, psi |
|---|---|---|---|---|---|---|
| 51.9 | 22.2 | 25.9 | 0 | 80 | 24 | 2240 |
| 51.9 | 22.2 | 25.9 | 25 | 80 | 24 | 418 |
| 51.9 | 22.2 | 25.9 | 38 | 80 | 24 | 123 |

[1]% by weight of the cementitious composition
[2]% by volume of the cementitious composition

EXAMPLE 3

Additional cementitious compositions of this invention were prepared utilizing fine particle size Portland cement with and without gypsum cement and with and without various resinous materials. Upon being formed, the cementitious compositions were allowed to cure at a temperature of 100° F. for 24 hours whereupon the compressive strengths of the compositions were determined as described in Example 1 above. The results of these tests are set forth in Table IV below.

TABLE IV

| Fine Particle Size Portland Cement, % by weight[1] | Gypsum Cement, % by weight[1] | Resinous Material- % by weight[1] | Water, % by weight[1] | Curing Temp, °F. | Curing Time, hrs | Compressive Strength, psi |
|---|---|---|---|---|---|---|
| 41.5 | 0.0 | None | 58.5 | 120 | 24 | 391 |
| 39.8 | 2.8 | Phenolic-1.2 | 56.2 | 120 | 24 | 454 |
| 39.8 | 0.0 | Vernonia Oil-4 | 56.2 | 120 | 24 | 439 |

[1]% by weight of cementitious composition

From Tables III and IV above, it can be seen that the various cementitious compositions tested produced good compressive strength and are suitable for use in well cementing operations with and without drilling fluid as a component thereof.

The methods of the present invention for cementing a well basically comprise the steps of forming a cementing composition of the invention, introducing the composition into a zone to be cemented and permitting the composition to set into a hard cementitious mass therein.

Thus, the present invention is well adapted to carry out the objects and attain the ends and advantages mentioned as well as those which are inherent therein. While numerous changes may be made to the compositions and methods by those skilled in the art, such changes are encompassed within the spirit of this invention as defined by the appended claims.

What is claimed is:

1. A method of cementing a well with a cementitious composition containing a portion of the drilling fluid used to drill the well as a component of the cementing composition comprising the steps of:

forming a cementitious composition comprised of, a cementitious material selected from the group consisting of Portland cement, high alumina cement, slag, fly ash, condensed silica fume with lime, gypsum cement and mixtures of said cementitious materials;

a drilling fluid present in said composition in an amount up to about 70% by volume of said cementitious material or materials therein;

a hardenable resinous material selected from the group consisting of vernonia oil, epoxidized linseed oil or soy oil, an acrylic resinous material, an epoxy resinous material, a phenolic resinous material and mixtures of said resinous materials present in said composition in an amount in the range of from about 1% to about 50% by weight of said cementitious material or materials therein; and water present in said composition in an amount in the range of from about 20% to about 175% by weight of said cementitious material or materials therein;

introducing said composition into said well; and permitting said composition to set into a hard cementitious mass therein.

2. The method of claim 1 wherein said cementitious composition further comprises a dispersing agent selected from the group consisting of the condensation polymer product of acetone, formaldehyde and sodium sulfite, a blend of polyvinylpyrrolidone and the condensate of sodium naphthalene sulfonate with formaldehyde, a blend of a lignosulfonate salt with polyvinylpyrrolidone and the condensate of sodium naphthalene sulfonate with formaldehyde, a low molecular weight polyacrylic acid, a mixture of sulfite liquor and n-methyl, n-oleyl taurine and naphthalene sulfonic acid, said dispersing agent being present in said composition in an amount up to about 10% by weight of said cementitious material or materials in said composition.

3. The method of claim 1 wherein said cementitious composition further comprises a set delaying additive selected from the group consisting of ammonium and metal lignosulfonate salts, tartaric acid, citric acid, sodium citrate, the copolymer of 2-acrylamido-2-methyl propane sulfonic acid and acrylic acid, aminotri(methylene phosphonic) acid and mixtures of such set delaying additives, said set delaying additive being present in said composition in an amount up to about 10% by weight of said cementitious material or materials in said composition.

4. The method of claim 1 wherein said cementitious material includes fine particle size Portland cement having particle diameters no greater than about 30 microns and a Blaine Fineness no less than about 6000 square centimeters per gram.

5. The method of claim 1 wherein said cementitious material is selected from the group consisting of fine particle size Portland cement, ASTM Class C fly ash and gypsum cement, said hardenable resinous material is a phenolic resinous material, said dispersing agent is the condensation polymer product of acetone, formaldehyde and sodium sulfite and said set delaying agent is sodium citrate.

* * * * *